Figure 1:
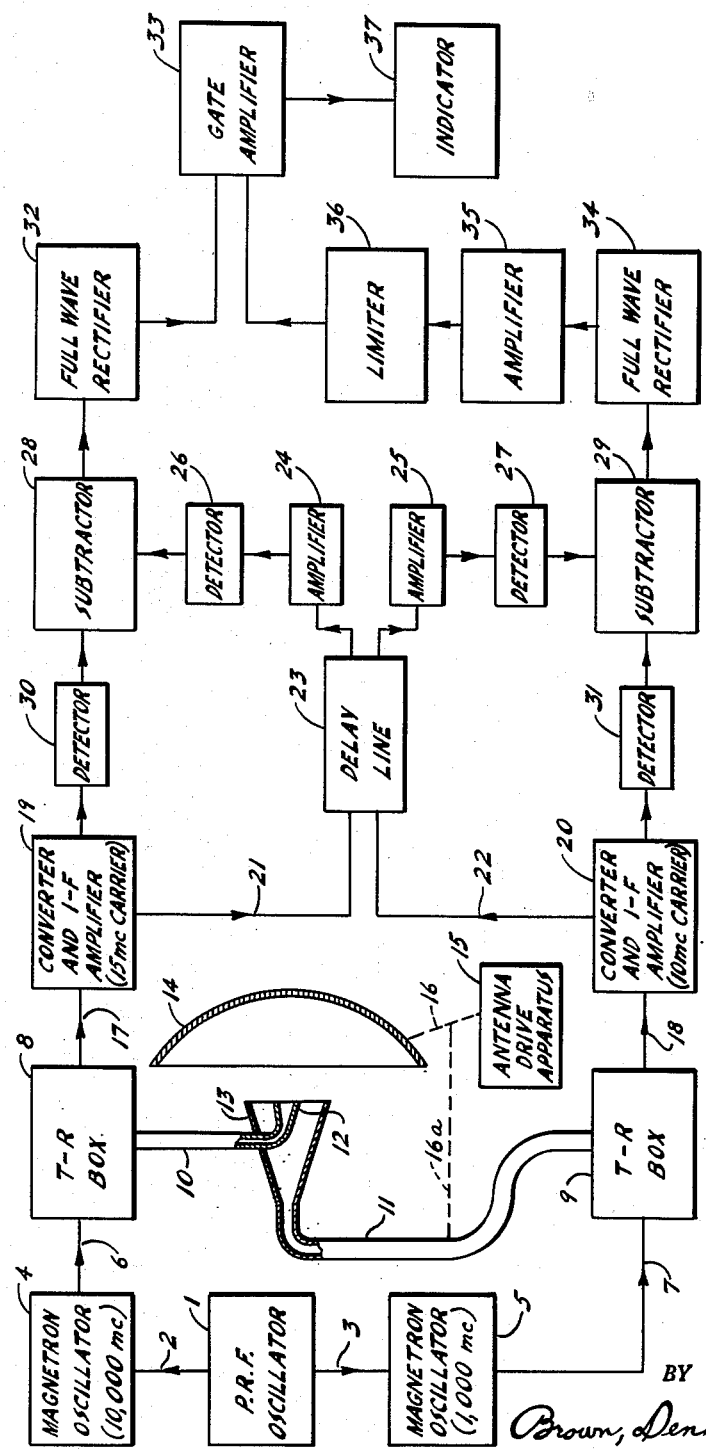

Patented Apr. 15, 1952

2,593,071

UNITED STATES PATENT OFFICE 2,593,071

OBJECT MOTION INDICATING SYSTEM

David E. Sunstein, Cynwyd, Pa., and Arthur H. Mankin, North Merrick, N. Y., assignors to Philco Corporation, Philadelphia, Pa., a corporation of Pennsylvania Application March 21, 1947, Serial No. 736,202

14 Claims. (Cl. 343—9)

The invention herein described and claimed relates to radar object motion indicating systems. More particularly it relates to improved systems of this sort, having minimum responsiveness to targets moving with less than a predetermined velocity, and having high directional resolution for targets whose bearings from the location of the equipment differ by but a small angular amount.

For certain applications it is desirable to minimize the response of object motion indicators to targets of low velocities. Thus it may be desired to detect vehicles moving on a highway, but not persons walking thereon or trees swaying in the wind. Moreover it has been observed that airborne object motion indicators also tend to respond, under certain circumstances, to reflections from terrain and fixed targets. This is generally undesirable.

In the embodiment of the invention hereinafter to be described, the principles of the invention are applied to a radar target motion indicating system of the so-called storage type. In such systems, pulses of high frequency energy are customarily transmitted in succession at a predetermined repetition rate. Reflections of such transmitted pulses from target objects are intercepted by a suitable receiver and stored until the arrival of subsequent reflections from the same objects resulting from subsequently transmitted high frequency energy pulses. The subsequently received reflections are compared with the stored reflections from the same targets, and any difference between the two is taken as indicating target motion. Although the invention is particularly applicable to a system of this general type, it is to be understood that its application is not so limited, and that it is also susceptible of embodiment in systems differing in their mode of operation from that of the storage type systems. For example, as will hereinafter become apparent, the invention could readily be embodied in a system resembling more closely one of the prior art which is often referred to as a "one shot" system. In such a system the need for storing reflections from target objects and comparing them with subsequently received reflections is eliminated, and an indication of object motion is obtained by observing the alterations in certain characteristics of transmitted energy upon reflection from a target object. However, it is to be noted that a system of this latter type normally possesses a response which can readily be minimized for objects moving with less than a predetermined velocity. Hence, in such a system, one of the principal advantages of the present invention is not so urgently needed; although it is conceivable that, in certain applications, it would be desirable further to improve the operation of such a system by constructing it in accordance with the principles hereinafter set forth.

It is known that, in an object motion indicator of the storage type above referred to, the response to low velocity targets can to some extent be controlled by varying the frequency of the transmitted energy. Thus, by lowering this frequency, the system can be made less responsive to low velocity targets. However, lowering the frequency of the transmitted energy introduces other disadvantages which may be particularly objectionable. For example, for an antenna of a given size, lowering the frequency of the transmitted energy will reduce the directional resolution of the system for targets having different bearings from the transmitter.

Accordingly the principal objects of the invention are:

(1) To provide a radar object motion indicating system possessing advantages of both high and low frequency prior art systems;

(2) To provide an object motion indicator of the reflection type which is primarily responsive to targets moving with velocities in excess of a predetermined minimum and which has high directional resolution;

(3) To provide an object motion indicator of the reflection type which, while employing a radiator of limited dimensions, has high directional resolution and is adapted to emphasize targets moving with velocities in excess of a predetermined minimum;

(4) To provide an object motion indicator of the reflection type for use in moving vehicles, such as aircraft, and which has minimized responsiveness to reflections from terrain and other fixed targets; and (5) To provide a method for detecting targets moving with velocities in excess of a predetermined minimum, to the substantial exclusion of targets having velocities less than said minimum, and for simultaneously indicating the bearings of said targets, with a reference to a predetermined point, with a high degree of precision.

According to the invention there are provided means for radiating high frequency energy of at least two substantially different frequencies. In the event that common antenna means are utilized to effect such radiation, the patterns according to which said different frequencies are radiated will be of substantially different widths but may be made partially coincident. Means are provided for receiving reflections of radiated energy of both frequencies from target objects. Because of the difference in the frequencies transmitted, the receiving means for reflections resulting from the low frequency energy can be made principally responsive to reflections from objects moving with velocities in excess of a relatively high minimum value, while the receiving means for reflections resulting from high frequency transmitted energy will necessarily be responsive to reflections from objects moving with velocities less than said value. However, as already pointed out, the directional resolution of the system for reflections of low frequency energy will, in the case of a common antenna, be substantially less than for reflections of high frequency energy. By utilizing the output from either of the receiving means to control the transmission, to a conventional indicator, of the output from the other receiving means, it can be arranged that the indicator shall, under most circumstances, respond only to reflections from target objects lying within the relatively narrow radiation pattern of the high frequency energy and whose velocities are in excess of the predetermined minimum to which the low frequency receiver is responsive. Thus there is provided a system which combines the principal advantages of both high and low frequency radar target motion indicating systems.

Figure 2:
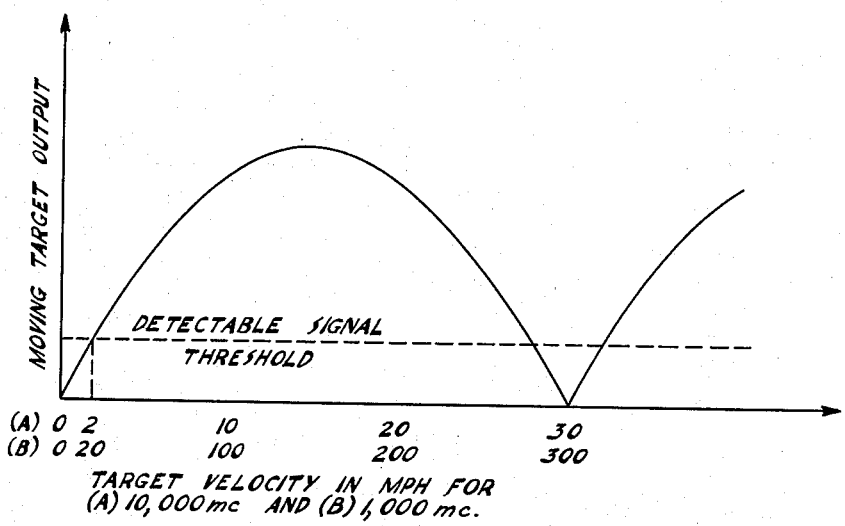
Figure 3:
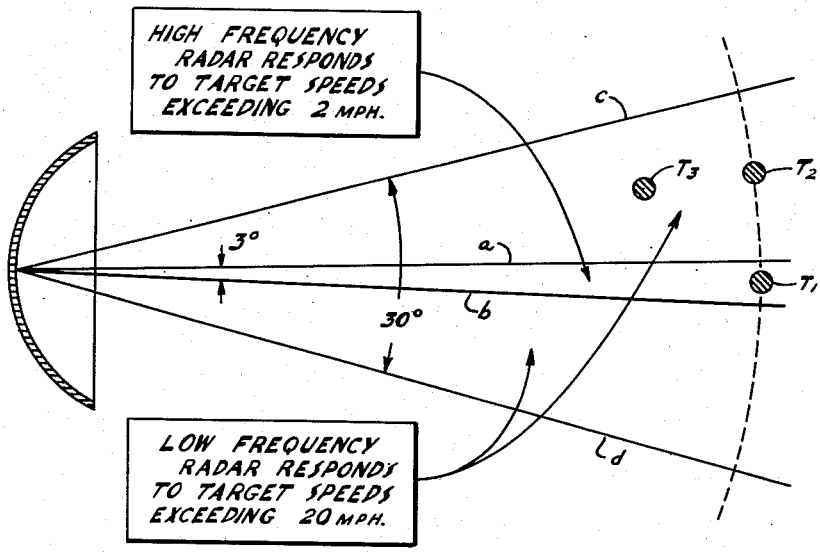

The principle of the invention and the arrangement and mode of operation of a representative embodiment thereof, as well as other features and advantages of the invention, will be more fully understood from a consideration of the following detailed description with reference to the accompanying drawings in which:

Figure 1 is a diagrammatic representation of a representative embodiment of the invention, and Figures 2 and 3 are explanatory diagrams to which reference will be made in the course of the following description.

Referring now to Figure 1, P. R. F. (pulse repetition frequency) oscillator 1 is any suitable means adapted to generate time-spaced pulse signals of relatively short duration, recurrent at a predetermined frequency, which, for example, may be of the order of one-thousand cycles per second. As is well known, this repetition rate is determined by the maximum range of target object against which the system is to be used. These pulses are supplied through connections 2 and 3 respectively to magnetron oscillators 4 and 5 to control the generation, by these oscillators, of time-spaced pulses of high frequency energy recurrent at the pulse repetition frequency. The frequency of the energy contained in the pulses generated by each of these oscillators is made substantially different; although both oscillators may be adapted to generate energy in the so-called microwave range. Thus, for example, oscillator 4 may be adapted to generate oscillations at a frequency of ten-thousand megacycles per second, while oscillator 5 may be adapted to generate oscillations at a frequency of one-thousand megacycles per second. The pulses of high frequency energy generated by oscillator 4 are supplied through connection 6, T-R box 8 and waveguide 10 to a radiating horn 12. In similar fashion the high frequency energy pulses generated by oscillator 5 are supplied through connection 7, T-R box 9 and waveguide 11 to radiating horn 13. The illustrations of horns 12 and 13 are not to scale for the particular frequencies here selected. Rather, for clarity of illustration, horn 12 has been shown considerably larger, as compared with horn 13, than it would actually be in practice.

T-R boxes 8 and 9 are both conventional devices, well known in the radar art, for the purpose of alternately permitting the passage of energy from oscillators 4 and 5 to radiating horns 12 and 13, while minimizing the amount of energy from oscillators 4 and 5 reaching converters and I.-F. amplifiers 19 and 20, which are also connected, respectively through T-R boxes 8 and 9 and waveguides 10 and 11, to horns 12 and 13 for the purpose of receiving incoming energy. Thus the T-R boxes are adapted to prevent interference with the operation of converters and I.-F. amplifiers 19 and 20 and possible destruction of certain of their delicate components. In their usual forms, T-R boxes 8 and 9 may each comprise a resonant discharge path enclosed in an evacuated envelope, the discharge path in each instance being connected effectively in series with the energy transmission channel from the oscillator to the radiating horn and in shunt with that from the horn to the converter and I.-F. amplifier. It is arranged that the discharge path shall conduct in response to large bursts of energy from the oscillator, but not in response to relatively smaller amounts of energy proceeding from the horn toward the converter and I.-F. amplifier.

As illustrated in the drawing (though not to scale), radiating horns 12 and 13 are of different dimensions owing to the difference in the frequency of energy which each is adapted to handle. Also, as illustrated, they may be substantially concentrically disposed, the smaller, high frequency horn 12 being disposed within the larger, low frequency horn 13 and being supplied with energy through the waveguide connection 10 which enters through the wall of low frequency horn 13. Thus horns 12 and 13 are adapted to direct energy of the two different frequencies against the interior surface of a suitable common reflector 14. This reflector may either be parabolic in form or may be modified in well known manner to provide a so-called cosecant-squared radiation pattern to equalize the amount of energy impinging on objects at different ranges. Reflector 14 and horns 12 and 13 are adapted to be controlled through mechanical linkages 16 and 16a by antenna drive apparatus 15 so as to vary the direction in which high frequency energy is radiated. Thus, for example, drive apparatus 15 may be adapted to cause reflector 14, as well as horns 12 and 13 to rotate about a common vertical axis while maintaining the same position relative to each other. Thus it is possible to cause the beams of radiated energy to sweep repeatedly through a complete circle so as to illuminate, with high frequency energy, all of the terrain or the objects in the space surrounding a particular location and within a predetermined range thereof.

Reflector 14 and horns 12 and 13 are also adapted to cooperate to receive pulses of energy of each of the two frequencies reflected from target objects. These reflections are supplied from horn 12 through waveguide 10, T-R box 8 and connection 17 to converter and I.-F. amplifier 19. Likewise, reflections are supplied from horn 13 through waveguide 11, T-R box 9 and connection 18 to converter and I.-F. amplifier 20. Converter and I.-F. amplifier 19 is adapted to convert the carrier frequency of reflections of pulses transmitted at the higher carrier frequency to a suitable intermediate frequency of, for example, fifteen megacycles per second. Converter and I.-F. amplifier 20, on the other hand, is adapted to convert the carrier frequency of reflections of pulses transmitted at the lower carrier frequency to a different intermediate frequency of, for example, ten megacycles per second. By reason of the difference in the intermediate frequencies produced by the two converters and intermediate frequency amplifiers, their outputs may be supplied to a common delay line 23, which is adapted to delay each signal by an amount equal to the pulse repetition period.

Delay line 23 may be of any of the forms customarily employed in conventional object motion indicators of the so-called storage type. Thus, for example, it may be an electro-mechanical delay device, comprising a column of mercury or other medium suitable for the propagation of supersonic waves, having a crystal transducer at one end supplied with the outputs from converters and I.-F. amplifiers 19 and 20, and having a similar transducer at the other end for the purpose of reconverting the supersonic oscillations transmitted through the column into delayed electrical signals corresponding to the respective input signals. Alternatively, separate transducers may be provided at each end of the column for the two intermediate frequencies, but this, in general, is not necessary. The delayed output signals corresponding respectively to the input signals from amplifiers 19 and 20 are then supplied to amplifiers 24 and 25 respectively. Amplifier 24 is constructed and arranged to amplify the fifteen megacycles per second intermediate frequency signal to the exclusion of the ten megacycles per second signal. Amplifier 25, on the other hand, is adapted to amplify the ten megacycles per second signal to the exclusion of the fifteen megacycles per second signal. The output of amplifier 24 is detected by detector 26 and is supplied to subtractor 28. Likewise, the output of amplifier 25 is detected by detector 27 and is supplied to subtractor 29.

The outputs of I.-F. amplifiers 19 and 20 are also separately detected by detectors 30 and 31 respectively, and the detected signals are supplied, undelayed, to subtractors 28 and 29 respectively. Subtractor 28 is a conventional amplifier to which the delayed and undelayed detected signals from converter and I.-F. amplifier 19 are supplied, in opposite phase, to yield, at its output, a signal corresponding to the difference between the delayed and undelayed signals. Subtractor 29 performs the same function, and in the same manner, with respect to the delayed and undelayed outputs from converter and I.-F. amplifier 20.

It is well known that such differences are produced when successive transmitted pulses are reflected from a moving target object. Such successive reflections will differ in frequency or phase and will beat, either with reflections from nearby fixed targets or with a signal locally generated at the receiver and cohered in phase with the transmitted pulses, to yield, at the receiver, signals of fluctuating amplitude. No source of a coherent signal is illustrated in the system according to Figure 1, it being contemplated that variations in the amplitude of signals received from moving targets will be produced by beating of the reflections with reflections from surrounding landmass.

The output of subtractor 28 is preferably supplied to a full-wave rectifier 32 so that all difference signals appearing in the output of subtractor 28 will be made to appear at the output of full-wave rectifier 32 in the same sense. This rectified output is supplied to a gate amplifier 33. The output of subtractor 29 is supplied to a full-wave rectifier 34 for similar reasons, and the output of full-wave rectifier 34 is preferably amplified in amplifier 35 and limited in limiter 36 to provide a control signal of sufficient magnitude, and of uniform strength, to control the operation of gate amplifier 33. The output of gate amplifier 33 is supplied to a suitable indicator 37 which may be a cathode ray device of the usual form employed in radar systems.

It will be seen that the complete system just described incorporates two complete radar object motion indicating systems of the so-called storage type well known in the prior art; some of the components of the systems being common. In the high frequency system, the object motion discriminator comprises delay line 23, amplifier 24, detectors 26 and 30 and subtractor 28; while, in the low frequency radar, the object motion discriminator comprises the same delay line 23, amplifier 25, detectors 27 and 31, and subtractor 29. The output of subtractor 29 is utilized to control the transductivity of gate amplifier 33, through which the output of subtractor 28 is supplied to indicator 37. The manner in which this control is effected and the result produced thereby will presently be made apparent.

Considering now the operation of the system according to Figure 1, as is well established, both theoretically and practically, the output of subtractors 28 and 29 will vary depending upon the velocities of target objects from which reflected signals are received. More specifically, the outputs of these subtractors will rise and fall periodically as a function of target velocity. However, the rate of such periodic variation in the output signals will differ for the two subtractors. In the instance of subtractor 28, associated with the high frequency radar operating at a carrier frequency of 10,000 megacycles per second and a pulse repetition frequency of 1 kilocycle per second, the output from the subtractor may have nulls corresponding to targets moving at velocities of 0, 30, 60, 90, etc. miles per hour. On the other hand, the output of subtractor 29, associated with the low frequency radar operating at a carrier frequency of 1,000 megacycles per second and the same pulse repetition frequency, may exhibit nulls corresponding to target velocities of 0, 300, 600, 900, etc. miles per hour. The responses for the two systems are both illustrated, for somewhat more than a single cycle of response variation, in Figure 2. Here it will be seen that the same curve, taken with reference to different scales, illustrates the response for both subtractors. Also, it will be noted that, in each instance, signals whose level is below a predetermined threshold value, determined by noise in the system, will, for practical purposes, be undetectable. For example, it will be seen that the output from subtractor 28, associated with the high frequency radar, will contain only indications of targets whose velocities exceed two miles per hour; while the output from subtractor 29, associated with the low frequency radar, will contain only signals produced in response to target objects whose velocities exceed 20 miles per hour. Thus the low frequency half of the system will be less responsive to low velocity targets than will the high frequency portion. It will also be noted that the response of each radar will fall below the detectable threshold level for certain higher values of target velocity (i. e. for velocities in the neighborhood of 30 M. P. H. and integral multiples thereof, in the case of the high frequency system; and for velocities in the neighborhood of 300 M. P. H. and integral multiples thereof, in the case of the low frequency system).

Considering now another aspect of the operation of the system according to Figure 1, the radiation pattern of the reflector 14 in cooperation with horn 12 for 10,000 megacycle energy will be much narrower than the radiation pattern for reflector 14 in cooperation with horn 13 for 1,000 megacycle energy. Thus, for a three-foot reflector, the half-power beam-width for the higher transmitted frequency may be of the order of three degrees, while the half-power beam-width for the lower transmitted frequency may be thirty degrees. This means that the high frequency system will have directional resolution for targets at different bearings from the antenna approximately ten times that of the low frequency system. For this reason the output of subtractor 28, associated with the high frequency system which has high directional resolution, can be used in conjunction with the output of subtractor 29, associated with the low frequency system which has minimized response to low velocity targets, to provide an output signal incorporating both of these desirable features. To this end, in accordance with the arrangement of Figure 1, the output from subtractor 28 is supplied through full-wave rectifier 32 to gate amplifier 33, and the transductivity of the latter is controlled in response to the output from subtractor 29, so that an output signal from gate amplifier 33 is supplied to indicator 37 only when there is simultaneous output from both subtractors 28 and 29.

The effect of using the outputs of the low and high frequency systems in this manner to control the production of a single output signal will be more readily appreciated by reference to the diagram of Figure 3. In this diagram are represented the boundaries of the beams produced by the antenna of the system of Figure 1 for the high and low frequencies respectively. Lines $a$ and $b$ represent the boundaries of the high frequency beam, while lines $c$ and $d$ represent the boundaries of the low frequency beam. It will be noted that a target $T_1$, lying within the high as well as within the low frequency beam and moving with a velocity less than two miles per hour, will produce no detectable output in either subtractor 28 or 29. If target $T_1$ is moving at a velocity between two and twenty miles per hour, a signal will appear in the output of subtractor 28 but none will appear in the output of subtractor 29. Hence the signal from subtractor 28 will be prevented from passing through gate amplifier 23 to indicator 37. If, however, target $T_1$ is moving with a velocity somewhat in excess of twenty miles per hour, signals will appear in the outputs of both subtractors 28 and 29, and gate amplifier 33 will be rendered capable of transmitting the signal from subtractor 28 to indicator 37. It will of course be apparent that, for velocities of $T_1$ in the neighborhood of 30 M. P. H. and integral multiples thereof, the output of subtractor 28 will fall below the detectable signal threshold and will therefore be insufficient to produce an indication regardless of the magnitude of output from subtractor 29. Thus, in effect, the system will be blind to targets moving with certain velocities, but, by proper selection of the transmitted frequency, these blind spots may be adjusted to occur most advantageously for a particular application.

A target $T_2$ lying within the low frequency beam, but outside the narrower high frequency beam, will obviously produce no response in subtractor 28 under any circumstances. Thus, in general, indications will be provided by indicator 37 only in response to targets lying within the beam of the high frequency radar defined by lines $a$ and $b$ in Figure 3 and moving with velocities in excess of twenty miles per hour. There is one exception to this general statement, to which reference will now be made. Thus, for example, if a target $T_2$ exists at the same range as target $T_1$, and if target $T_2$ is moving with a velocity somewhat in excess of twenty miles per hour, while target $T_1$ is moving at a velocity between two and twenty miles per hour, signals will appear in the outputs of both subtractors 28 and 29 and will result in the production of an indication by indicator 37. However, it is to be noted that this can only happen if targets $T_1$ and $T_2$ are at substantially the same range. Thus a target $T_3$, moving at a velocity in excess of twenty miles per hour and at a different range than target $T_1$, will not tend to produce an indication, even if target $T_1$ is moving at a velocity between two and twenty miles per hour. Inasmuch as the occurrence of two targets at substantially the same range, in the normal application of a radar target motion indicating system, is relatively infrequent, this feature of the system will not ordinarily prove to be of any appreciable disadvantage.

As previously mentioned, one of the objects of the invention is to provide a radar object motion indicator having minimized responsiveness to reflections from terrain and other fixed targets. Both theoretical consideration and actual observation have shown that, in an airborne system employing a given transmitted pulse length and radiated beam-width, interference from fixed targets decreases with the range of the targets in the direction along the ground track (i. e. the projection of the line of flight on the ground); while, in the direction perpendicular to the ground track, it increases with range. In other words, the characteristics of reflections are such as to indicate motion of targets which, in fact, are fixed. In the direction along the ground track this apparent velocity of fixed targets decreases with the range of the target; while, in the direction perpendicular to the ground track, it increases with range. This phenomenon appears to result from the fact that, for finite beam-width and pulse length, a finite area on the terrain is illuminated by high frequency radiation. The aircraft, and the radar equipment therein, are approaching different points in this area at different speeds. The reflections from different points are therefore shifted in frequency by different amounts and beat to produce, from the area illuminated, a composite reflection which fluctuates in amplitude. In systems constructed in accordance with the present invention, the response will generally be such as to reduce substantially the response to fixed targets, and even, in most instances, to eliminate substantially all response to fixed targets along the ground track and an appreciable distance on either side thereof.

Accordingly, by the invention there has been provided a search type radar which, for most practical purposes, is responsive only to targets moving with velocities in excess of a predeterminable minimum and which, furthermore, is responsive only to targets lying within a beam of radiated energy whose width is independently determinable and which can be scanned, as in a conventional search radar, to investigate various sectors.

It will be understood that the invention is susceptible of embodiment in physical forms other than the one here illustrated and described, and that, accordingly, it is subject only to the limitations in scope imposed by the appended claims.

We claim:

1. In an object motion indicating system of the reflection type, means for radiating high frequency energy of at least two different frequencies and for receiving reflections of said energy from target objects, means responsive to energy of one of said frequencies reflected from target objects for developing signals indicative of motion of said objects, said last-named means comprising means for delaying energy of said one frequency reflected from target objects and for comparing said delayed energy with energy of said one frequency subsequently reflected from the same target objects to develop signals indicative of alterations in characteristics of said reflected energy owing to motion of said objects, a device adapted to utilize said developed signals, and means responsive to energy of said other frequency reflected from target objects for controlling the supply of said developed signals to said utilization device.

2. In an object motion indicating system of the reflection type, means for transmitting high frequency energy of at least two different frequencies and for receiving reflections of said energy from target objects, means responsive to energy of one of said frequencies reflected from target objects for developing signals indicative of motion of said objects, an indicator adapted to be supplied with said developed signals to provide indications of moving objects, and a transducer for supplying said developed signals to said indicator and whose transductivity is controlled in response to energy of the other of said frequencies reflected from said target objects.

3. In an object motion indicating system of the reflection type, orientable antenna means for directionally transmitting high frequency energy of at least two different frequencies and for directionally receiving reflections of said energy from target objects, said means having a relatively wider radiation pattern for one of said frequencies than for the other frequency, means responsive to energy of said one frequency reflected from target objects for developing signals indicative of motion of said objects, a device adapted to utilize said developed signals, and means responsive to energy of said other frequency reflected from target objects for controlling the supply of said developed signals to said utilization device.

4. In an object motion indicating system of the reflection type, means for radiating high frequency energy of at least two different frequencies and for receiving reflections of said energy from target objects, means responsive to received reflections of energy of one of said frequencies for developing signals only in response to reflections from targets which are in motion, an indicator adapted to be supplied with two separate input signals and responsive to produce an indication only when both of said input signals are supplied thereto simultaneously, means for supplying said developed signals to said indicator as one of said separate input signals, and means for supplying thereto as the other of said separate input signals received reflections of energy of the other of said frequencies.

5. In an object motion indicating system of the reflection type, orientable means for directionally transmitting high frequency energy of different frequencies, a receiver of energy of one of said frequencies reflected from target objects, said receiver being principally responsive to reflections from objects whose velocities exceed a predetermined minimum to produce output signals, a receiver of energy of another of said frequencies reflected from target objects, said receiver being principally responsive to reflections from objects whose bearings differ from the orientation of said transmitting means by less than a predetermined amount to produce output signals, an indicator adapted to be supplied with two separate input signals and responsive to produce indications only when both of said input signals are supplied thereto simultaneously, and means for supplying the output signals from said receivers to said indicator as said separate input signals.

6. In an object motion indicating system of the reflection type, means for transmitting high frequency energy of at least two substantially different frequencies and for receiving reflections of said energy from target objects, means separately responsive to energy of each of said frequencies for developing separate signals indicative of motion of said objects, an indicator adapted to be supplied with two separate input signals and responsive to produce indications only when both of said input signals are supplied thereto simultaneously, and means for supplying said separate developed signals to said indicator as said separate input signals.

7. A system according to claim 4 in which said means for developing signals indicative of moving objects is responsive to energy of the lower of said two frequencies reflected from target objects.

8. A system according to claim 4 in which said high frequency energy of one of said two frequencies is transmitted in a beam of predetermined width, and said high frequency energy of the other of said two frequencies is transmitted in a beam of substantially different width.

9. A system according to claim 8 in which said two beams in which said energy is transmitted are partially coincident.

10. A system according to claim 8 in which energy of the lower of said two frequencies is transmitted in a beam which is substantially wider than the beam in which energy of the higher of said two frequencies is transmitted.

11. A system according to claim 4 in which said means for transmitting high frequency energy comprises a common antenna structure supplied with energy of both of said two different frequencies.

12. Apparatus according to claim 4 in which said means for transmitting high frequency energy and for receiving reflections of said energy from target objects comprises a single antenna structure utilized for both transmission and reception.

13. In combination, a first object position indicating system of the reflection type for producing output only in response to moving targets, said system being characterized in having high discrimination against low velocity targets and poor ability to resolve targets whose angular displacement is small, a second object position indicating system of the reflection type for producing output only in response to moving targets, said system being characterized in having good ability to resolve targets whose angular displacement is small and low discrimination against low velocity targets, an indicator adapted to be supplied with two separate input signals and responsive to produce indications only when both of said input signals are supplied thereto simultaneously, and means for supplying the outputs from both of said systems to said indicator as said separate input signals.

14. In combination, a first object position indicating system of the reflection type for producing output only in response to moving targets, said system being characterized in having high discrimination against targets whose velocities lie within a predetermined range and poor ability to resolve targets whose angular displacement is small, a second object position indicating system of the reflection type for producing output only in response to moving targets, said system being characterized in having good ability to resolve targets whose angular displacement is small and low discrimination against targets whose velocities lie within said predetermined range, an indicator adapted to be supplied with two separate input signals and responsive to produce indications only when both of said input signals are supplied thereto simultaneously, and means for supplying the outputs from both of said systems to said indicator as said separate input signals.

DAVID E. SUNSTEIN.
ARTHUR H. MANKIN.

REFERENCES CITED

The following references are of record in the file of this patent:

UNITED STATES PATENTS

| Number | Name | Date |
|---|---|---|
| 2,139,460 | Potapenko | Dec. 6, 1938 |
| 2,277,464 | Taylor | Mar. 24, 1942 |
| 2,407,169 | Loughren | Sept. 3, 1946 |
| 2,409,462 | Zworykin | Oct. 15, 1946 |
| 2,418,156 | Bollman | Apr. 1, 1947 |
| 2,427,219 | Luck | Sept. 9, 1947 |
| 2,433,283 | Luck | Dec. 23, 1947 |
| 2,435,615 | Varian | Feb. 10, 1948 |
| 2,451,822 | Guanella | Oct. 19, 1948 |
| 2,467,670 | Hershberger | Apr. 19, 1949 |
| 2,468,751 | Hansen | May 3, 1949 |
| 2,524,296 | Mesner | Oct. 3, 1950 |